(12) United States Patent
Guen

(10) Patent No.: US 8,999,569 B2
(45) Date of Patent: Apr. 7, 2015

(54) RECHARGEABLE BATTERY INCLUDING A TERMINAL CONNECTING MEMBER

(75) Inventor: Min-Hyung Guen, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 823 days.

(21) Appl. No.: 13/137,335

(22) Filed: Aug. 8, 2011

(65) Prior Publication Data

US 2012/0258355 A1 Oct. 11, 2012

(30) Foreign Application Priority Data

Apr. 5, 2011 (KR) .................. 10-2011-0031323

(51) Int. Cl.
| | |
|---|---|
| H01M 2/02 | (2006.01) |
| H01M 2/06 | (2006.01) |
| H01M 2/08 | (2006.01) |
| H01M 2/30 | (2006.01) |
| H01M 10/04 | (2006.01) |
| H01M 2/36 | (2006.01) |

(52) U.S. Cl.
CPC ........ *H01M 2/06* (2013.01); *H01M 2/08* (2013.01); *H01M 2/30* (2013.01); *H01M 10/04* (2013.01); *H01M 2/36* (2013.01)

(58) Field of Classification Search
CPC ........... H01M 2/04; H01M 2/06; H01M 2/30; H01M 2/32; H01M 2/36
See application file for complete search history.

(56) References Cited

U.S. PATENT DOCUMENTS

| | | |
|---|---|---|
| 2002/0106553 A1 | 8/2002 | Nemoto et al. |
| 2009/0130552 A1 | 5/2009 | Kim |
| 2010/0233529 A1* | 9/2010 | Nansaka et al. ............... 429/181 |

FOREIGN PATENT DOCUMENTS

| | | | |
|---|---|---|---|
| JP | 11-339769 A | | 12/1999 |
| JP | 11339769 A | * | 12/1999 |
| JP | 2003-031206 A | | 1/2003 |
| JP | 2003031206 A | * | 1/2003 |
| JP | 2004-111362 | | 8/2004 |
| KR | 10-2006-0112745 A | | 11/2006 |
| KR | 10-0951906 | | 1/2010 |

OTHER PUBLICATIONS

Machine translation for Matsuura et al., JP 2003-031206 A.*
Machine translation for Masumoto et al., JP 11-339769 A.*
Korean Office Action in KR 10-2011-0031323, dated Aug. 8, 2012 (Guen).

* cited by examiner

*Primary Examiner* — Edu E Enin-Okut
(74) *Attorney, Agent, or Firm* — Lee & Morse, P.C.

(57) ABSTRACT

A rechargeable battery including an electrode assembly, the electrode assembly including a positive electrode and a negative electrode; a case accommodating the electrode assembly; a terminal electrically connected to the electrode assembly, the terminal being exposed outside the case; a terminal connecting member extending outside of the case from an interior thereof, the terminal connecting member electrically connecting the electrode assembly and the terminal, and including an electrolyte solution inlet therein; and a sealing cap coupled with the terminal connecting member, the sealing cap covering the electrolyte solution inlet.

9 Claims, 6 Drawing Sheets

101

RECHARGEABLE BATTERY INCLUDING A TERMINAL CONNECTING MEMBER

BACKGROUND

1. Field

Embodiments relate to a rechargeable battery.

2. Description of the Related Art

A rechargeable battery differs from a primary battery in that it may be repeatedly charged and discharged, while a primary battery makes only the irreversible conversion of chemical to electrical energy. A low-capacity rechargeable battery may be used as a power supply for small electronic devices, e.g., cellular phones, notebook computers, and camcorders, while a high-capacity rechargeable battery may be used as a power supply for driving motors in hybrid vehicles and the like.

A high-power rechargeable battery using a non-aqueous electrolyte with high energy density has recently been developed. For example, the high-power rechargeable battery may be constructed as a high-capacity rechargeable battery having a plurality of rechargeable cells coupled to each other in series to be used as a power supply for driving motors in electric vehicles requiring large capacity.

Further, a large capacity battery module may be formed by a plurality of rechargeable batteries coupled in series, and the rechargeable batteries may have a cylindrical or prismatic shape.

The rechargeable battery may have a configuration in which a terminal connected to an electrode assembly (having a positive electrode and a negative electrode with a separator provided therebetween) protrudes outwardly.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly, the electrode assembly including a positive electrode and a negative electrode; a case accommodating the electrode assembly; a terminal electrically connected to the electrode assembly, the terminal being exposed outside the case; a terminal connecting member extending outside of the case from an interior thereof, the terminal connecting member electrically connecting the electrode assembly and the terminal, and including an electrolyte solution inlet therein; and a sealing cap coupled with the terminal connecting member, the sealing cap covering the electrolyte solution inlet.

An edge of the sealing cap may include a welded region thereon, and the terminal connecting member, the terminal, and the sealing cap may be fixed by the welded region.

The terminal may have a plate shape.

An upper part of the terminal connecting member may include a rivet thereon.

The rechargeable battery may further include a lower cap coupled with a bottom end of the electrolyte solution inlet.

A bottom end of the electrolyte solution inlet may include a lower step, the lower step having a transverse cross-sectional area greater than a transverse cross-sectional area of the electrolyte solution inlet, and the lower cap may be coupled with the lower step.

When an electrolyte solution is injected, the lower cap may be pressed by a connected wire and inserted into and coupled with the bottom end of the electrolyte solution inlet.

The terminal may include a terminal column inserted thereinto, the terminal column protruding upwardly.

The terminal connecting member may include a groove into which the sealing cap is inserted, the groove having a width greater than a width of the electrolyte solution inlet.

The groove may have an arc shaped longitudinal cross-section.

A top end of the groove may be at an edge of a top end of the terminal connecting member.

A top surface of the sealing cap may be substantially coplanar with a top surface of the terminal, and an edge of a top end of the sealing cap may abut an edge of a top end of the terminal connecting member.

The terminal connecting member may include an upper step below the groove, the upper step having a transverse cross-sectional area that is greater than a transverse cross-sectional area of the electrolyte solution inlet and less than a transverse cross-sectional area of the groove.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
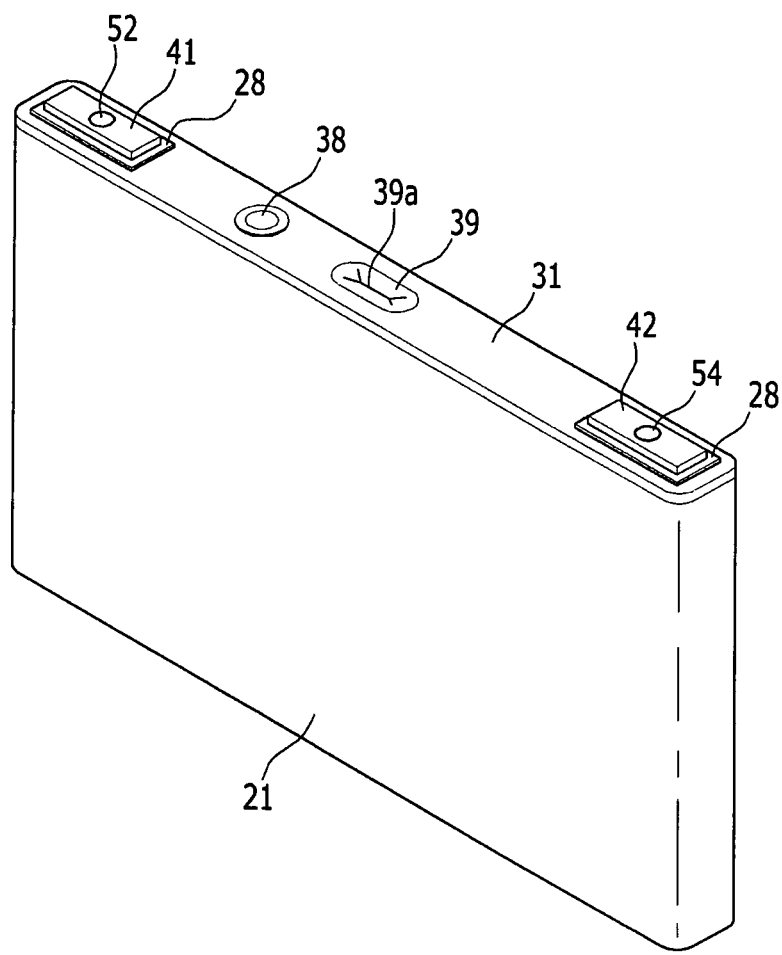
FIG. 1 illustrates a perspective view of a rechargeable battery according to an embodiment.

Korean Patent Application No. 10-2011-0031323, filed on Apr. 5, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
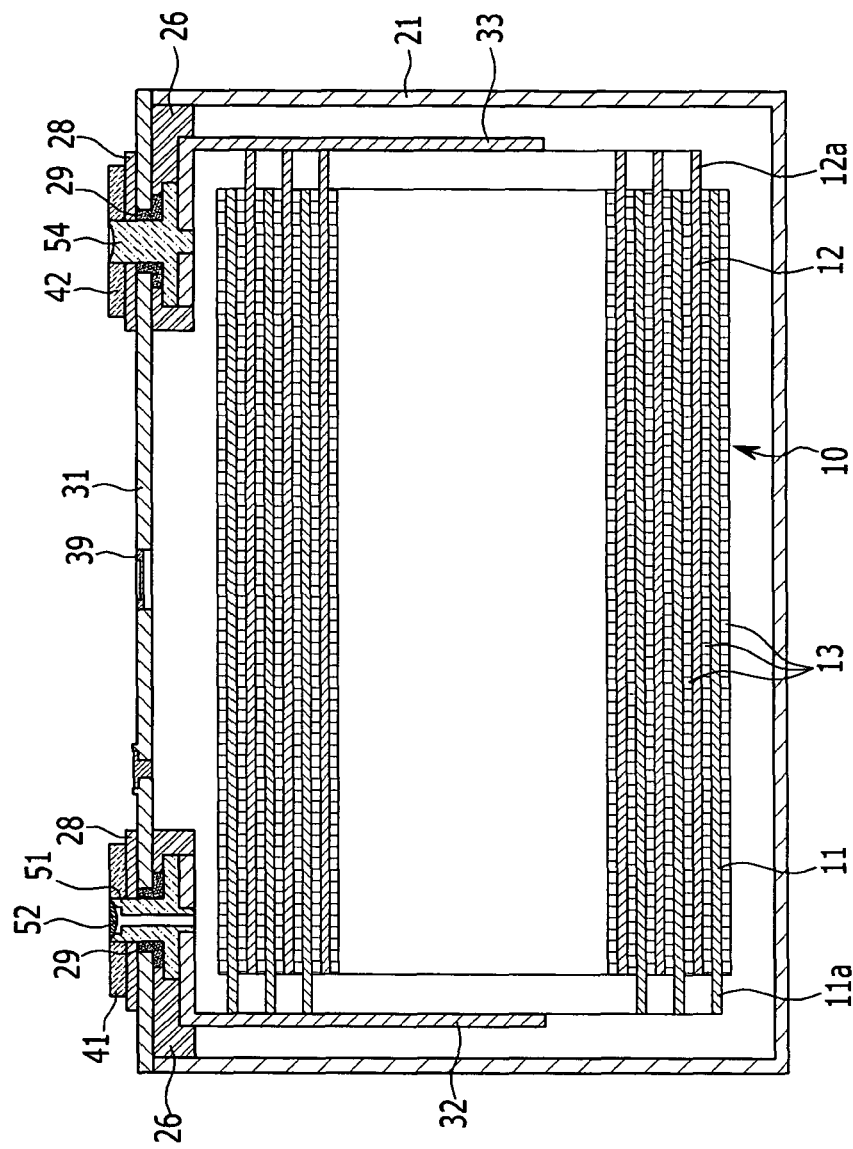
FIG. 2 illustrates a cross-sectional view of the rechargeable battery of FIG. 1.

FIG. 1 illustrates a perspective view of a rechargeable battery according to an embodiment. FIG. 2 illustrates a cross-sectional view of the rechargeable battery of FIG. 1 with respect to an X-Z plane along a line II-II of FIG. 1.

Referring to FIG. 1 and FIG. 2, the rechargeable battery 101 may include an electrode assembly 10 (in which a positive electrode 11 and a negative electrode 12 are wound with a separator 13 therebetween), a case 21 (accommodating the electrode assembly 10 therein), and a cap plate 31 (coupled with an opening of the case 21).

The rechargeable battery 101 according to the present embodiment may be a lithium ion rechargeable battery and may have an angular shape. However, the embodiments are not limited thereto, and may be applied to other types of batteries, e.g., a lithium polymer battery, a cylindrical battery, and the like.

The positive electrode 11 and the negative electrode 12 may include coated regions (in which an active material is coated on a current collecting material formed with a thin metal foil) and uncoated regions 11a and 12a (in which no active material is coated).

The positive electrode uncoated region 11a may be formed at one end of the positive electrode 11 (in a length direction of the positive electrode 11); and the negative electrode uncoated region 12a may be formed at another end of the negative electrode 12 (in a length direction of the negative electrode 12). The positive electrode 11 and the negative electrode 12 may be wound with the insulating separator 13 therebetween.

However, the embodiments are not limited thereto, and the electrode assembly 10 may have a structure in which the positive electrode and the negative electrode (that are formed by a plurality of sheets) are stacked with the separator interposed therebetween.

The case 21 may have a rectangular or hexahedral shape, may be formed of metal, and may have an opening.

The cap plate 31 may be a thin metal plate and may be coupled with the opening of the case 21. A first terminal 41 (electrically connected to the positive electrode 11) and a second terminal 42 (electrically connected to the negative electrode 12) may be installed in and protrude outside the cap plate 31. Also, a vent member 39 having a notch 39a may be installed in the cap plate so as to be fractured in response to a predetermined internal pressure.

The first terminal 41 may be electrically connected to the positive electrode 11 and the second terminal 42 may be electrically connected to the negative electrode 12, but the embodiments are not restricted thereto. For example, the first terminal 41 may be electrically connected to the negative electrode 12 and the second terminal 42 may be electrically connected to the positive electrode 11.

The first terminal 41 may be electrically connected to the positive electrode 11 via a current collector 32 and a terminal connecting member 51. In an implementation, a lower part of the current collector 32 may be connected to the positive electrode uncoated region 11a through welding; and an upper part thereof may be connected to the terminal connecting member 51 through welding.

The second terminal 42 may be electrically connected to the negative electrode 12 via a current collector 33 and a terminal connecting member 54. In an implementation, a lower part of the current collector 33 may be connected to the negative electrode uncoated region 12a through welding; and an upper part thereof may be connected to the terminal connecting member 54 through welding.

The first terminal 41 and the second terminal 42 may each have a plate shape; and the terminal connecting members 51 and 54 may each have a column shape with a flange (514, see FIG. 3) at a lower part thereof. The terminal connecting members 51 and 54 may be inserted into or pass through the first terminal 41 and the second terminal 42.

An upper gasket 28 (for insulation with the cap plate 31) may be installed below the first terminal 41 and the second terminal 42; and a lower gasket 29 (for sealing) may be installed between the cap plate 31 and the terminal connecting members 51 and 54.

Further, a lower insulating member 26 may be installed between the cap plate 31 and the current collectors 32 and 33. A groove (into which the flange 514 and the current collector 32 are inserted) may be formed on the lower insulating member 26 to support and insulate the terminal connecting member 51 and the current collector 32.

Figure 3:
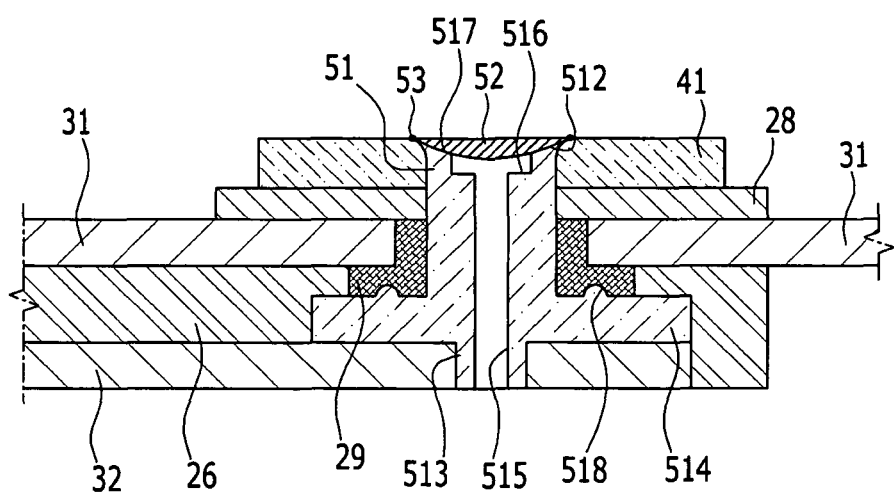
FIG. 3 illustrates a partial cross-sectional view of the rechargeable battery of FIG. 1.

FIG. 3 illustrates a partial cross-sectional view of the rechargeable battery of FIG. 1.

Referring to FIG. 2 and FIG. 3, the flange 514 contacting the current collector 32 may be formed at a first end of the terminal connecting member 51 connected to the first terminal 41. A rivet 512 (inserted into the first terminal 41 and extending outside) may be formed at a second end of the terminal connecting member 51, e.g., opposite to the first end. Also, a protrusion 513 (inserted into the current collector 32 and attached by, e.g., welding) may be formed below the flange 514.

In addition, another flange contacting the current collector 33 may be formed at a first end of the terminal connecting member 54 connected to the second terminal 42. A rivet (inserted into the second terminal 42 and extending outside) may be formed at a second end the terminal connecting member 54, e.g., opposite to the first end. In addition, a protrusion (inserted into the current collector 33 and attached by, e.g., welding) may be formed below the flange.

A top end of the terminal connecting member 51 may be pressed to be fixed to the cap plate 31 and the first terminal 41 while passing through the cap plate 31 and the first terminal 41. For example, the rivet 512 (that is pressed and extends outside) may be formed at the top end of the terminal connecting member 51. The rivet 512 may protrude around an external circumference of the terminal connecting member 51 and may support the terminal connecting member 51 to reduce the possibility of and/or prevent downward movement thereof. A pressure protrusion 518 (formed in a circumferential direction of the terminal connecting member 51) may press the lower gasket 29 (on a top surface of the flange 514) to seal a gap between the cap plate 31 and the terminal connecting member 51.

As shown in FIG. 3, an electrolyte solution inlet 515 may extend through the terminal connecting member 51. The present embodiment describes the electrolyte solution inlet in the terminal connecting member 51 that is electrically connected to the positive electrode 11, but the embodiments are not restricted thereto. For example, the electrolyte solution inlet may also be in the terminal connecting member electrically connected to the negative electrode.

A groove 517 may be formed in the terminal connecting member 51 at a top end of the electrolyte solution inlet 515 so that a sealing cap 52 may be inserted therein. The groove 517 may have a width greater than a width of the electrolyte solution inlet 515. A transverse cross-section of the groove 517 may have an arc shape; and a top end thereof may be on an edge of a top end of the terminal connecting member 51. The sealing cap 52 may be a metal cap for covering the electrolyte solution inlet 515 and may be inserted into the groove 517. A top surface of the sealing cap 52 may be on a same top surface as the first terminal 41; and an edge of a top end of the sealing cap 52 may meet or abut an edge of a top end of the terminal connecting member 51. For example, the top surface of the sealing cap 52 may be substantially coplanar with the top surface of the first terminal 41. In an implementation, the terminal connecting member 51, the sealing cap 52, and the first terminal 41 may be bonded through welding. A welded region 53 may fix the sealing cap 52, the terminal connecting member 51, and the first terminal 41. Therefore, the first terminal 41 may be electrically connected to the terminal connecting member 51 through a single welding process; and the sealing cap 52 may be coupled with the terminal connecting member 51 to reduce the possibility of and/or prevent leakage of the electrolyte solution.

The present embodiment has described the sealing cap 52 being bonded or coupled through welding, but the embodiments are not restricted thereto; and the sealing cap 52 may be bonded or coupled through various methods, e.g., by using an adhesive.

An upper step 516 (having transverse cross-sectional area less than a transverse cross-sectional area of the groove 517 and greater than a transverse cross-sectional area of the electrolyte solution inlet 515) may be formed below the groove 517. The upper step 516 may temporarily store an injected electrolyte solution and may reduce the possibility of and/or prevent the top end of the groove 517 from being contaminated by the electrolyte solution. If the welded top end of the groove 517 were to be contaminated by the electrolyte solution, the weld may be damaged. According to the present embodiment, the welded part may be separated from a space in which the electrolyte solution substantially moves, so damage to the weld may be prevented.

The electrolyte solution inlet 515 may extend through to the protrusion 513 from the upper step 516. The electrolyte solution may then be injected into the case 21 from a bottom surface of the protrusion 513. Accordingly, the electrolyte solution may be injected in a safe manner without influence by the current collector 32.

According to the present embodiment, the electrolyte solution inlet 515 may not be formed in the cap plate 31, so undesirable transformation of the cap plate 31 caused by welding the cap plate 31 and the sealing cap 52 may be prevented.

Further, the electrolyte solution inlet 515 may be formed in the terminal connecting member 51 rather than in the terminals 41 and 42. Thus, contamination of the terminals 41 and 42 by the electrolyte solution during injection of the electrolyte solution may be prevented. If the terminals 41 and 42 were to be contaminated with the electrolyte solution, the terminals 41 and 42 may be corroded or short-circuited, thereby causing the rechargeable battery to explode or combust.

For example, in the rechargeable battery having a plate-shaped terminal, the first terminal 41, the sealing cap 52, and the terminal connecting member 51 may be fixed through welding to simplify the assembly process and improve productivity.

Figure 4:
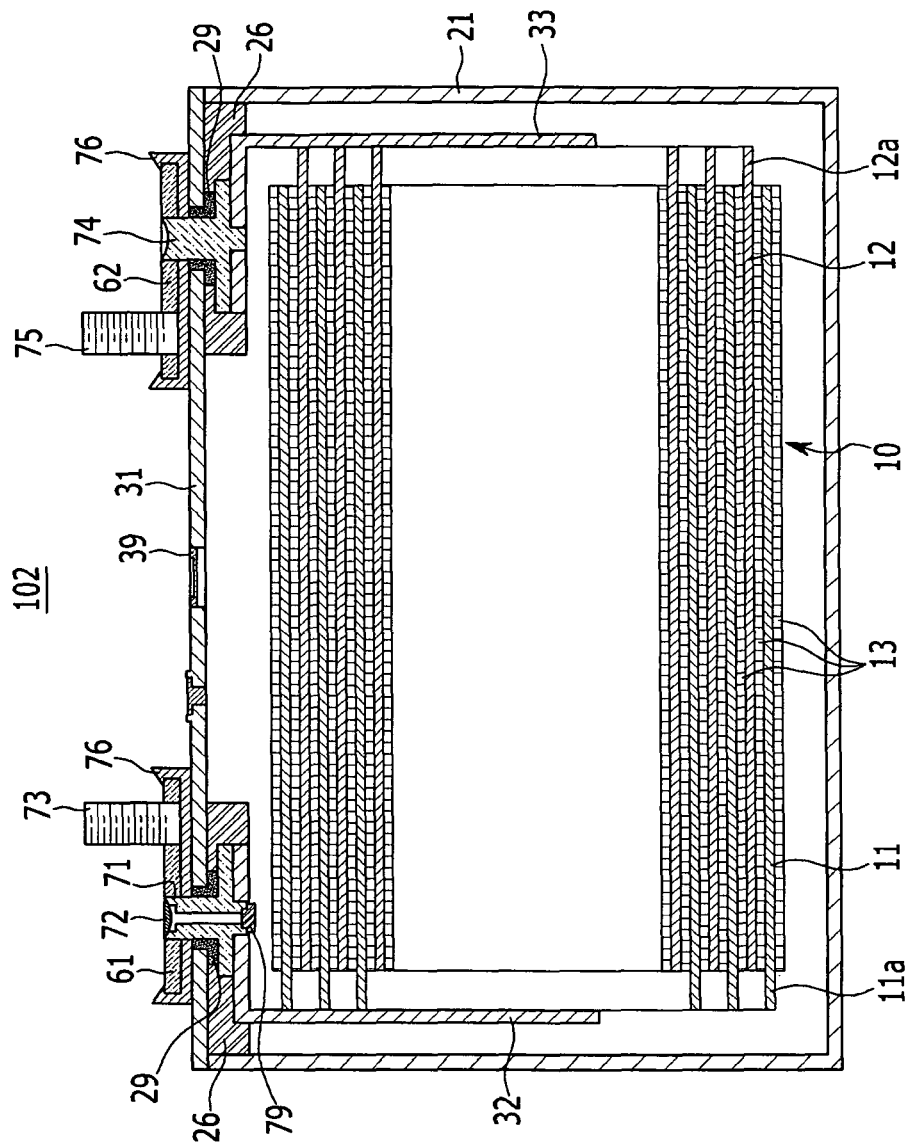
FIG. 4 illustrates a cross-sectional view of a rechargeable battery according to another embodiment.
Figure 5:
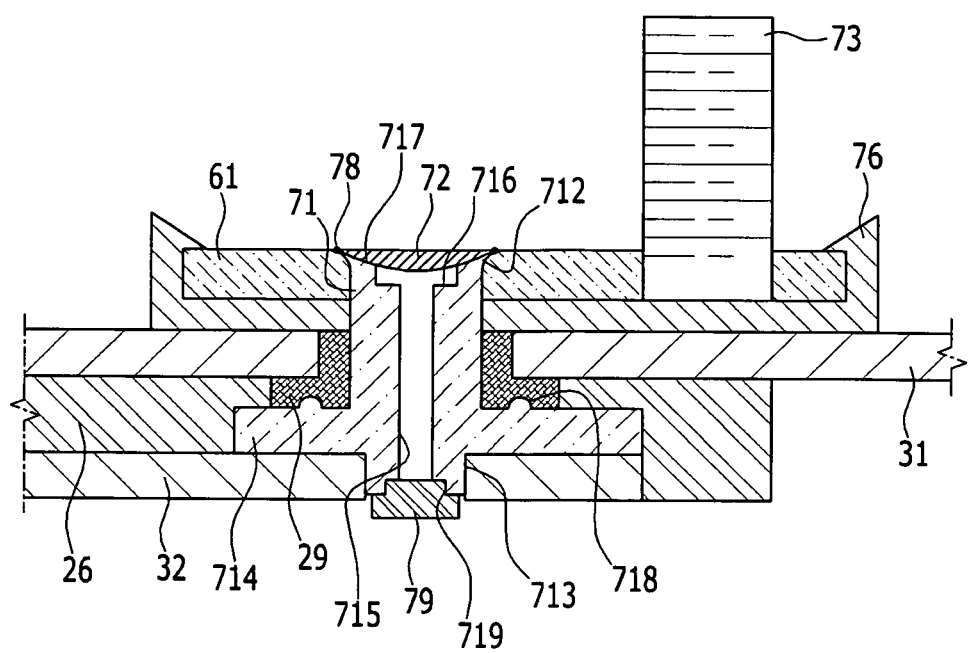
FIG. 5 illustrates a partial cross-sectional view of the rechargeable battery of FIG. 4.

FIG. 4 illustrates a cross-sectional view of a rechargeable battery according to another embodiment. FIG. 5 illustrates a partial cross-sectional view of the rechargeable battery of FIG. 4.

Referring to FIG. 4 and FIG. 5, the rechargeable battery 102 according to the present embodiment will now be described.

The rechargeable battery 102 may have the same configuration as the rechargeable battery according to the previous embodiment, except for terminal connecting members 71 and 74, a first terminal 61, a second terminal 62, and terminal columns 73 and 75. Thus, repeated description of the same configurations will be omitted.

The first terminal 61 may be electrically connected to the positive electrode 11 via the current collector 32 and the terminal connecting member 71. A lower part of the current collector 32 may be connected to the positive electrode uncoated region 11a through welding; and an upper part thereof may be fixed to the terminal connecting member 71 through welding.

The second terminal 62 may be electrically connected to the negative electrode 12 via a current collector 33 and the terminal connecting member 74. A lower part of the current collector 33 may be connected to the negative electrode uncoated region 12a through welding; and an upper part thereof may be fixed to the terminal connecting member 74 through welding.

The first terminal 61 and the second terminal 62 may each have a plate shape; and the terminal connecting members 71 and 74 may each have a column shape. The terminal connecting members 71 and 74 may each have a lower part having a flange 714 and may be inserted into the first terminal 61 and the second terminal 62.

The terminal column 73 may be installed on and inserted into the first terminal 61 and may protrude upwardly. The terminal column 75 may be installed on and inserted into the second terminal 62 and may protrude upwardly. The terminal columns 73 and 75 may have a cylindrical shape and may include screw threads on external circumferential surfaces thereof.

An upper gasket 76 (for insulation from the cap plate 31) may be installed below the first terminal 61 and the second terminal 62. A lower gasket 29 for sealing may be installed between the cap plate 31 and the terminal connecting members 71 and 74.

A hook (that protrudes inwardly to fix the first terminal or the second terminal) may be formed on the upper gasket 76.

The flange 714 (that contacts the current collector 32) may be formed at a first end of the terminal connecting member 71 that is connected to the first terminal 61. A rivet 712 (inserted into or passing through the first terminal 61 and extending outside) may be formed at a second end of the terminal connecting member 71, e.g., opposite to the first end. Also, a protrusion 713 (inserted into the current collector 32 and attached through welding) may be formed below the flange 714.

A flange (that contacts the current collector 33) may be formed at a first end of the terminal connecting member 74 that is connected to the second terminal 62. A rivet (inserted into or passing through the second terminal 62 and extending outside) may be formed at a second end of the terminal connecting member 74, e.g., opposite to the first end. In addition, a protrusion (inserted into the current collector 33 and attached through welding) may be formed below the flange.

A top end of the terminal connecting member 71 may be pressed to be fixed to the cap plate 31 and the first terminal 61 when passing through the cap plate 31 and the first terminal 61. For example, the rivet 712 (that is pressed and extends to the outside) may be formed at a top end of the terminal connecting member 71. The rivet 712 may protrude around an external circumferential surface of the terminal connecting member 71 and may support the terminal connecting member 71 to reduce the possibility of and/or prevent downward movement thereof. A pressure protrusion 718 (formed in a circumferential direction of the terminal connecting member 71 on a top surface of the flange 714) may press the lower gasket 29 to seal a gap between the cap plate 31 and the terminal connecting member 71.

As shown in FIG. 5, an electrolyte solution inlet 715 may extend through the terminal connecting member 71. The present embodiment describes the electrolyte solution inlet 715 in the terminal connecting member 71 electrically connected to the positive electrode 11, but the embodiments are not restricted thereto. For example, the electrolyte solution inlet may be formed on the terminal connecting member electrically connected to the negative electrode.

A groove 717 may be formed in the terminal connecting member 71 at a top end of the electrolyte solution inlet 715 so that a sealing cap 72 may be inserted therein. The groove 717 may have a width greater than a width of the electrolyte solution inlet 715. In an implementation, the groove 717 may have an arc-shaped transverse cross-section and a top end thereof may be on an edge of a top end of the terminal connecting member 71. The sealing cap 72 may be a metal cap for covering the electrolyte solution inlet 715 and may be inserted into the groove 717. A top surface of the sealing cap 72 may be on a same surface as a top surface of the first terminal 61. An edge of the top end of the sealing cap 72 may meet an edge of the top end of the terminal connecting member 71. For example, the top surface of the sealing cap 72 may be substantially coplanar with the top surface of the first terminal 41. In an implementation, the terminal connecting member 71, the sealing cap 72, and the first terminal 61 may be bonded through welding. A welded region 78 may be fixed to the sealing cap 72, the terminal connecting member 71, and the first terminal 61 to fix the sealing cap 52, the terminal connecting member 71, and the first terminal 61. Therefore, the first terminal 61 may be electrically connected to the terminal connecting member 71 through a single welding process; and the sealing cap 72 may be bonded or coupled with the terminal connecting member 71 to reduce the possibility of and/or stably prevent leakage of the electrolyte solution.

An upper step 716 (having a transverse cross-sectional area smaller than a transverse cross-sectional area of the groove 717 and greater than a transverse cross-sectional area of the electrolyte solution inlet 715) may be formed below the groove 717. The upper step 716 may temporarily store the injected electrolyte solution and may prevent the top end of the groove 717 from being contaminated by the electrolyte solution. If the welded top end of the groove 717 were to be contaminated by the electrolyte solution, the weld may be damaged. According to the present embodiment, the welded part may be separated from a space in which the electrolyte solution substantially moves, so damage to the weld may be prevented.

The electrolyte solution inlet 715 may extend through to the protrusion 713 from the upper step 716. The electrolyte solution may then be injected into the case 21 from a bottom surface of the protrusion 713. Accordingly, the electrolyte solution may be stably injected without being influenced by the current collector 32.

In addition, a lower cap 79 may be inserted into and coupled with a bottom end of the electrolyte solution inlet 715. A lower step 719 (having a transverse cross-sectional area larger than that of the electrolyte solution inlet 715) may be formed at a bottom end of the electrolyte solution inlet 715. Thus, the lower cap 79 may be inserted into and coupled with the lower step 719. The lower cap 79 may be made of, e.g., a synthetic resin, and, in an implementation, may be made of an elastic material.

Figure 6:
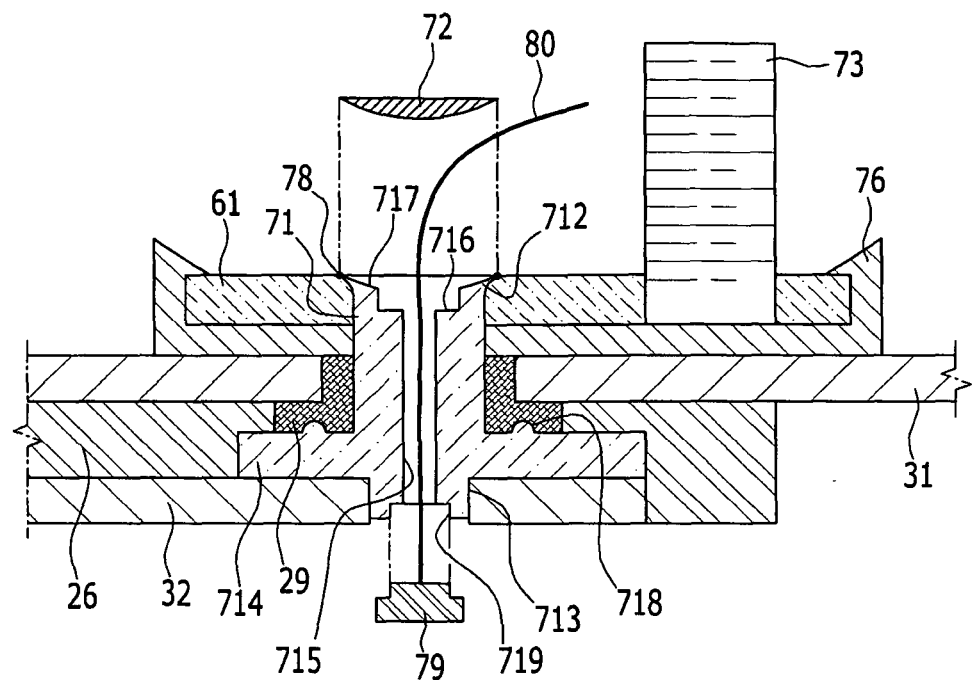
FIG. 6 illustrates a partial cross-sectional view showing a process for installing a lower cap and a sealing cap of the rechargeable battery of FIG. 4.

As shown in FIG. 6, a wire 80 may be connected to the lower cap 79 and, when the electrolyte solution is injected, the lower cap 79 may be drawn by the connected wire 80 and may be inserted into and coupled with the lower step 719. According to the present embodiment, the lower cap 79 may be easily inserted and coupled by using the wire 80. The wire 80 may be cut and discarded after the lower cap 79 is inserted and coupled. When the lower cap 79 is installed, the sealing cap 72 may be fixed to the terminal connecting member 71 and the first terminal 61 through welding.

In an implementation, the sealing cap 72, the terminal connecting member 71, and the first terminal 61 may be fixed through welding, and the electrolyte solution inlet may be sealed twice by installing the lower cap 79. Further, the terminal column 73 may be installed at a position spaced apart from the electrolyte solution inlet on the first terminal. Thus, contamination of the terminal column 73 by the electrolyte solution may be prevented in a stable manner.

By way of summation and review, an electrolyte solution inlet (for providing a path for injecting the electrolyte solution in the case) may be formed on the cap plate; and a closing and sealing member may be coupled with the electrolyte solution inlet by, e.g., laser welding, to reduce the possibility of and/or prevent the electrolyte solution from being discharged outside.

However, such an electrolyte solution injecting configuration may require an additional electrolyte solution inlet, and it may be difficult to maintain the sealed state of the electrolyte solution inlet in a stable manner. For example, if the inlet is contaminated while injecting the electrolyte solution, the welding may be incomplete and the electrolyte solution may leak. If the electrolyte solution leaks, the rechargeable battery may combust or explode because of a short circuit caused by the electrolyte solution.

When a member for closing and sealing the inlet is welded on the cap plate, the cap plate may be warped if the cap plate is thin. The thickness of the cap plate may be increased to prevent warping. However, if the thickness of the cap plate is excessively increased, the production cost may be increased and the weight of the rechargeable battery may also be increased, thereby deteriorating output per weight.

The embodiments provide a rechargeable battery formed by a simplified assembly process and improving sealing performance of an electrolyte solution inlet.

According to the embodiments, the electrolyte solution inlet may not be installed in the cap plate so warping of the cap plate (caused by welding the cap plate and the sealing cap) may be prevented. Also, the electrolyte solution inlet may be formed not on the terminal but rather on the terminal connecting member, so contamination of the terminal by the electrolyte solution while the electrolyte solution is injected may be prevented.

For example, assembly of the rechargeable battery may be simplified by fixing the terminal, the sealing cap, and the terminal connecting member by a single welding process, so productivity may be improved for the rechargeable battery having a plate-shaped terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly, the electrode assembly including a positive electrode and a negative electrode;
   a case accommodating the electrode assembly;
   a terminal electrically connected to the electrode assembly, the terminal being exposed outside the case;
   a terminal connecting member extending outside of the case from an interior thereof, the terminal connecting member:
   electrically connecting the electrode assembly and the terminal, and
   including an electrolyte solution inlet therein; and
   a sealing cap coupled with an outer side of the terminal connecting member, the sealing cap covering the electrolyte solution inlet, wherein:
   the terminal connecting member includes a groove into which the sealing cap is inserted, the groove having a width greater than a width of the electrolyte solution inlet,
   the width of the groove at a widest point thereof is about the same as a width of an adjacent top end of the terminal connecting member such that the groove at the widest point thereof abuts an edge of the top end of the terminal connecting member and abuts an outer edge of the sealing cap,
   the edge of the top end of terminal connecting member, the terminal, and the outer edge of the sealing cap are adjacent to one another and are fixed by a single continuous weld, and
   the terminal has a plate shape.

2. The rechargeable battery as claimed in claim 1, wherein an upper part of the terminal connecting member includes a rivet thereon.

3. The rechargeable battery as claimed in claim 1, further comprising a lower cap coupled with a bottom end of the electrolyte solution inlet.

4. The rechargeable battery as claimed in claim 3, wherein:
   a bottom end of the electrolyte solution inlet includes a lower step, the lower step having a transverse cross-sectional area greater than a transverse cross-sectional area of the electrolyte solution inlet, and
   the lower cap is coupled with the lower step.

5. The rechargeable battery as claimed in claim 3, wherein, when an electrolyte solution is injected, the lower cap is pressed by a connected wire and is inserted into and coupled with the bottom end of the electrolyte solution inlet.

6. The rechargeable battery as claimed in claim 1, wherein the terminal includes a terminal column inserted thereinto, the terminal column protruding upwardly.

7. The rechargeable battery as claimed in claim 1, wherein the groove has an arc shaped longitudinal cross-section.

8. The rechargeable battery as claimed in claim 1, wherein:
   a top surface of the sealing cap is substantially coplanar with a top surface of the terminal, and
   an edge of a top end of the sealing cap abuts an edge of the top end of the terminal connecting member.

9. The rechargeable battery as claimed in claim 1, wherein the terminal connecting member includes an upper step below the groove, the upper step having a transverse cross-sectional area that is greater than a transverse cross-sectional area of the electrolyte solution inlet and less than a transverse cross-sectional area of the groove.

* * * * *